April 4, 1961 W. E. HESSE ET AL 2,978,070
CONTROL SYSTEM FOR ELEVATOR MOTORS
Filed Feb. 2, 1959 3 Sheets-Sheet 3

Fig. 3

INVENTORS.
William E. Hesse.
BY John F. Shawhan.
Raymond B. Pohlman, Jr.
Wood, Herron & Evans
ATTORNEYS.

United States Patent Office 2,978,070
Patented Apr. 4, 1961

2,978,070

CONTROL SYSTEM FOR ELEVATOR MOTORS

William E. Hesse and John F. Shawhan, Cincinnati, and Raymond B. Pohlman, Jr., Madeira, Ohio, assignors to Dover Corporation, Washington, D.C., a corporation of Delaware Filed Feb. 2, 1959, Ser. No. 790,500

16 Claims. (Cl. 187—29)

The present invention relates to motor control systems and is particularly directed to a novel system for governing the operation of an elevator motor in a Ward Leonard system.

More specifically, the present invention relates to high speed elevators using the Ward Leonard system in which the direction and speed of rotation of the main elevator driving motor are controlled by varying the excitation of a generator and consequently the generator voltage which is applied to drive the elevator motor. In a high speed elevator system using a motor control of the Ward Leonard type, it has been customary to cause deceleration of the elevator motor by inserting resistances in series with the main generator field in definite steps. The insertion of these resistances tends to produce objectionable bumps or jolts as the elevator is slowed down. It has previously been proposed to damp out or smooth out the acceleration and deceleration of the elevator by means of a small damping motor, the armature of which is connected across the generator shunt field. During the acceleration period, the damping motor functions to retard the build-up of the generator voltage, smoothing out any peaks in the voltage curve and providing a smoother ride for the elevator passengers. Similarly, when the elevator is decelerated by sequentially inserting resistances in series with the main generator shunt field, the peaks caused by the insertion of these resistances are minimized by the damping motor.

In addition to these components, a conventional Ward Leonard elevator system includes an electro magnetic brake which operates on the main elevator drive motor shaft to bring the elevator cab to a stop. This brake is applied and the generator field is deenergized when the car reaches a predetermined distance from the desired floor.

Systems of this type are subject to several disadvantages. In the first place, the electro magnetic brake requires constant attention and adjustment and as soon as the brake becomes out of adjustment, its operation results in uncomfortable jolts for the passengers so that the benefits of smoothing out the deceleration period are off-set by the bumps attendant application of the brake. Moreover, since the brake must mechanically overcome both the car inertia and the inertia of its associated drive equipment, the brake must be applied while the car is still an appreciable distance from floor level. However, the effectiveness of a mechanical brake to stop the elevator cab varies not only with such constantly varying factors as the condition of the brake lining, temperature, humidity, and the like, but also with the load carried by the elevator cab. As a result, an elevator car is often brought to a stop an appreciable distance out of level with the desired floor. This condition is dangerous to passengers and is further disadvantageous since it makes it more difficult to shift loads between the floor and the elevator car. This difficulty is frequently aggravated due to the fact that the Ward Leonard generator retains a substantial residual magnetism causing a sizable current flow even after the generator field has been deenergized. This current when applied to the elevator motor, tends to drive this motor beyond the elevator floor further increasing the leveling error so that it is not uncommon to have an elevator one-half inch or more out of level. Even when this error is reduced by releveling, it is unsatisfactory since appreciable time is wasted in the releveling operation.

The principal object of the present invention is to provide a novel elevator motor control system of the Ward Leonard type in which a damping motor is effective to reduce the rate of change of generator excitation during acceleration and deceleration and is additionally effective to change the polarity on the generator field during stopping so that the voltage supplied by the generator to the elevator motor is reversed and the elevator motor is actually plugged to a stop electrically, the application of the electro magnetic brake being withheld until after the car has been brought to a stop.

One important advantage of the present invention is that the entire travel from starting to stopping of an elevator car is extremely smooth, there being no bumps whatsoever during acceleration or deceleration, or when the brake is applied since the application of the brake is withheld until the cab has already been brought to a full stop.

An additional object of the present invention is to provide a control system which is relatively simple in operation, is readily adjusted initially, and thereafter requires a minimum amount of attention. In the present control system these objects are obtained by connecting a damping motor across the shunt field of the main generator during the acceleration period and a large portion of the deceleration period of the elevator. The D.C. motor is provided with an inertia element such as a fly wheel which tends to resist changes in the motor armature speed. Thus, the motor functions in a generally conventional manner to retard build-up of the generator voltage during acceleration and to smooth out changes when the deceleration resistors are inserted in series with the generator shunt field.

Additionally, however, in the present system, when the elevator cab reaches a predetermined distance from the floor, the damping motor is disconnected from the generator shunt field and a potential is applied to the damping motor armature so that that motor is accelerated, storing a predetermined amount of energy in its inertia fly wheel. Thereafter, when the elevator cab reaches a point only a small distance from the floor, the exciter supply is removed from the damping motor armature but the armature continues to rotate because of the inertia stored in the fly wheel. At the same time, the damping motor armature is reconnected to the generator shunt field in the reverse direction. The damping motor thus functions as a generator and the output of this generator reenergizes the generator shunt field with a polarity opposite to the previous polarity of the shunt field. This voltage applied to the generator shunt field by the damping motor initially cancels the residual generator field causing the generator output voltage to be reduced to zero; and thereafter reverses the polarity of the generator field and the polarity of the generator output so that the generator plugs the elevator motor to a rapid stop before the electro magnetic brake is applied.

One advantage of this system is that the necessity for frequent attention to the brake has been eliminated since the brake is subjected to only a minimum wear in view of the fact that its function is merely that of holding the elevator cab in place after it has been brought to a stop by dynamic braking.

A still further advantage of the present invention is that the leveling accuracy of the car is substantially increased so that the car may be brought into accurate registry with any desired floor. Not only are the effects of such unpredictable factors as temperature, humidity, brake wear, and the like, eliminated; but in addition, the "dead zone" or distance the car travels after receiving the final stopping signal until it is at precisely the desired floor level, is substantially reduced. For example, in a conventional Ward Leonard system, it is customary to deenergize the electric elevator motor and apply the brake when the cab is from one to two inches from the floor. In a typical installation constructed in accordance with the present invention, the elevator motor is not plugged until the car is within a small distance, of the order of one fourth of an inch from the floor. Thus, the "dead zone" has been reduced from four to eight times with an attendant increase in leveling accuracy.

An additional advantage of the present invention is that if for some reason the elevator car does slightly overshoot the floor and a releveling becomes necessary, the releveling is accomplished much more quickly than in a conventional Ward Leonard system since the residual polarity of the generator shunt field was reversed at the end of the approach to the floor; and consequently, the generator is effective to drive the elevator in a reverse direction almost instantaneously upon receipt of a releveling signal without the delay usually caused while the residual magnetism of the generator is overcome and the generator output is reversed.

An additional important advantage of the present system is that the initial adjustment of the system for optimum performance is readily made and moreover, once this adjustment has been made, the system requires only a minimum amount of maintenance. More particularly, it will readily be appreciated that the stopping distance of the elevator depends upon the magnitude of the plugging voltage produced by the damping motor. This plugging voltage in turn depends upon the amount of energy stored in the damping motor fly wheel, and therefore upon the maximum speed obtained by the damping motor during its acceleration period.

The present invention is predicated, in part, upon the concept that the plugging voltage can readily be controlled by accelerating the damping motor between the time when it functions as a damping motor in circuit with the main generator field and the time it functions as a generator. In the present system, the maximum speed of the damping motor and hence the plugging voltage developed by that motor are readily controlled by means of a variable resistance connected in series with the damping motor armature during the damping motor acceleration period. This adjustment is completely independent of the normal acceleration and deceleration control resistors which are completely out of the circuit when the damping motor is accelerated and when it later functions as a generator. Thus, only one resistor need be adjusted in the damping motor circuit and changes in the resistors normally controlling acceleration and deceleration have no effect upon the action of the damping motor.

These and other objects and advantages of the present invention will be more readily apparent from the following detailed description of the drawings illustrating a preferred embodiment of the invention.

Figure 1:
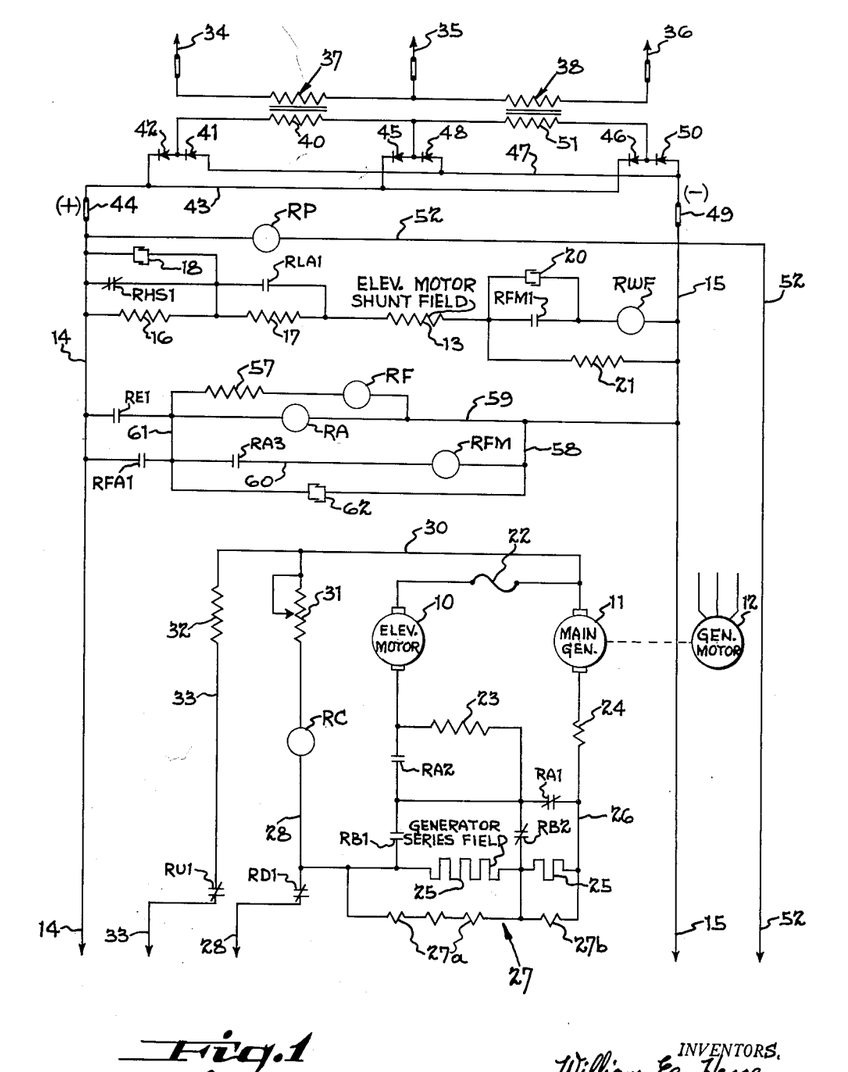
Figures 1-3 represent a simplified schematic circuit diagram showing an elevator control system embodying the present invention.

As shown in Figure 1, an elevator system constructed in accordance with this invention includes a direct current elevator motor 10. This elevator motor is provided with a shaft (not shown) in driving connection with a traction sheave about which are wound the car supporting cables for an elevator cab (not shown). It is to be understood that the shaft of the motor is further provided with a suitable brake drum and cooperating electro-magnetic brake; i.e., a brake that is spring urged to operating position and is released in response to the energization of a solenoid. These latter elements are conventional and are so well known by those skilled in the art that except for the brake solenoid they have been omitted from the drawings for purposes of simplicity.

Elevator motor 10 is electrically connected in a Ward Leonard system to a main generator 11 which is driven by a separately energized generator motor 12 which may be of any suitable type, such as a three-phase alternating current motor. Elevator motor 10 is provided with a shunt field 13 adapted to be energized from power lines 14 and 15.

More particularly, the elevator motor shunt field 13 is connected to power line 14 through series connected resistors 16 and 17. Resistor 16 is shunted by normally closed contact RHS1 of high speed relay RHS, an arc preventing capacitor 18 is connected across the contacts of this relay. It is to be noted that throughout the specification, a relay is designated by an "R" followed by one or more letters; e.g., "RL." The various contacts of each relay are identified by the same letters followed by a number designating the particular contact of the relay referred to. Thus, RL2 denotes the second contact of relay RL. Resistor 17 is shunted by contact RLA1 of auxiliary leveling relay RLA. The elevator motor shunt field 13 is similarly adapted to be connected to power line 15 through the series combination of contact RFM1 of field maintaining relay RFM and the coil of weak field protection relay RWF. The relay contacts RFM1 are shunted by a capacitor 20, while the series combination of the contacts and relay coil RWF is shunted by resistor 21.

As is shown in Figure 1, one brush of the armature of elevator motor 10 is connected to one brush of the armature of main generator 11 through an overload protection device 22. The second brush of the elevator motor armature is connected to the opposite brush of the main generator armature through resistor 23, normally closed contact RA1 of relay RA and the interpole generator winding 24. Resistor 23 is shunted by contact RA2 of relay RA. A generator series winding 27 is connected in series with the generator armature and interpole winding 24 through lead 26. Generator series field winding 27 is divided with approximately three-fourths of the field winding being indicated at 27a and one fourth of the field winding being indicated at 27b.

A normally closed contact RB2 of relay RB is connected between the two portions 27a and 27b of the generator series winding, these contacts also being connected to resistor 23 and contact RA1. The opposite terminal of series winding field 27a is also connected to contact RB1 of relay RB, and is adapted to be connected to the elevator motor armature through contacts RA2, these relay contacts and generator series field being shunted by resistors 25. Relay contacts RB1 are also connected to a lead 28 containing normally closed contacts RD1 of down relay RD.

The opposite brush of the main generator is connected to a lead 30, lead 30 being connected to lead 28 through a variable resistance 31 and relay coil RC. Lead 30 is also connected through resistor 32 to line 33 which contains normally closed contact RU1 of "up" relay RU. Leads 33 and 28 are adapted to be connected to lines 14 and 15 and to a damping and plugging circuit described below.

As shown in Figure 1, line 14 is a positive line while line 15 is a negative line. Power for these lines is taken from main power lines 34, 35, and 36 carrying three-phase electrical power. The primary winding of a first transformer 37 is connected across power lines 34 and 35, while the primary winding of a second transformer 38 is connected across lines 35 and 36. One terminal of secondary winding 40 of transformer 37 is connected to rectifiers 41 and 42. Rectifier 42 is in turn connected to line 43 which is joined through a fuse 44 to line 14 and is joined to rectifiers 45 and 46. Rectifier 41 is similarly joined to a conductor 47 which is connected to line 15 through fuse 49 and to rectifiers 48 and 50. The second terminal of secondary winding 40 is connected to rectifiers 45 and 48. In a similar manner, one terminal of secondary winding 51 is connected to rectifiers 45 and 48 while the second terminal of this winding is connected to rectifiers 46 and 50.

Figure 2:
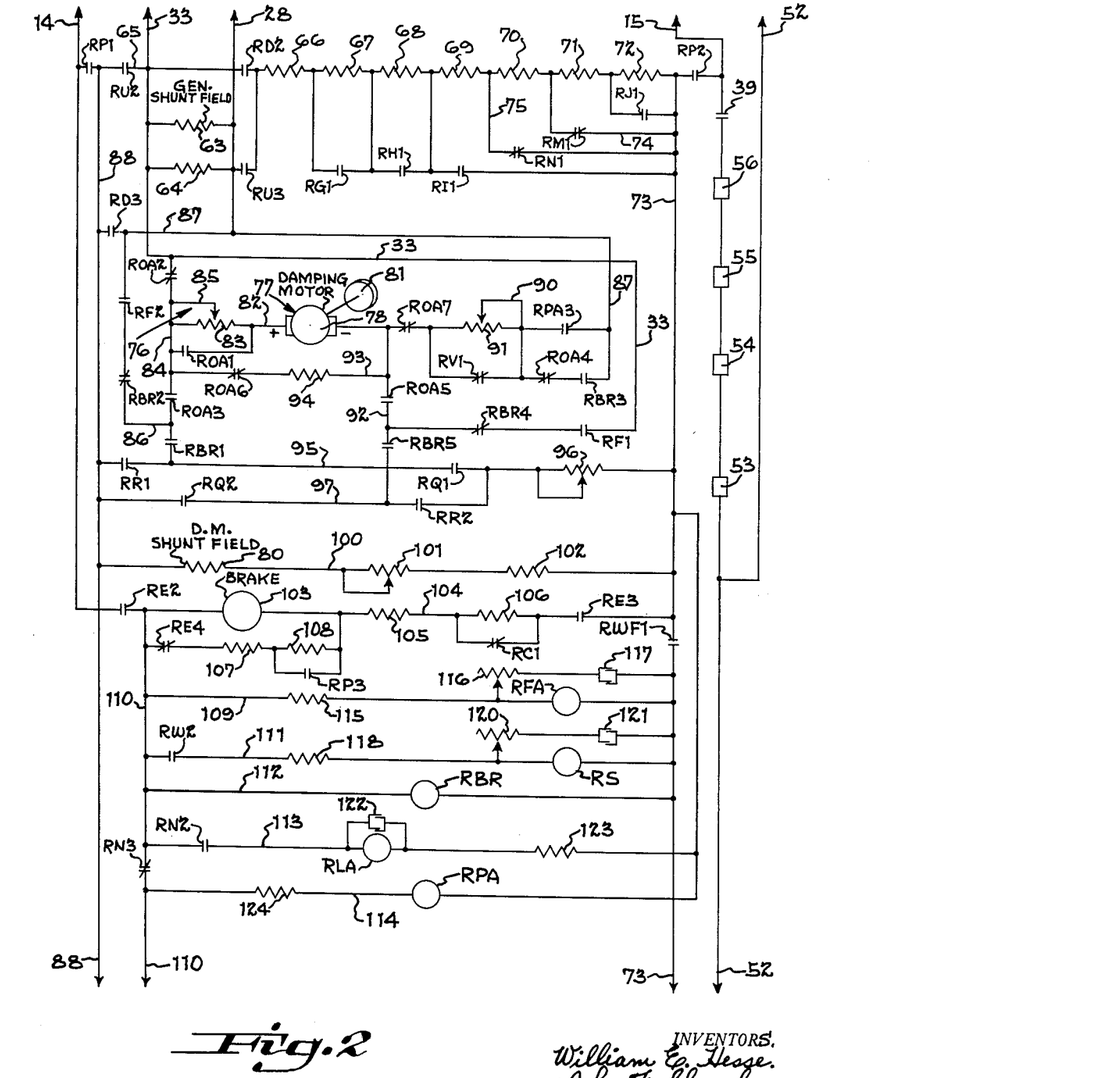

A lead 52 is taken from line 14. As is shown in Figure 2, this lead contains relay coil RP and conventional safety switches numbered 53, 54, 55, and 56. Switch 53 is a car safety release catch switch, switch 54 is a down final limit switch, switch 55 is an up final limit switch, and switch 56 is a governor switch. These switches are connected in series with relay contact 39. The coil of this relay is not shown, but it is to be understood that the relay is energized whenever the main generator motor 12 is operating properly. Consequently relay RP is normally energized so long as the various safety switches remained closed.

Other components of the main control system are shown in Figure 1. These include relay coil RA which is connected to power line 14 through lead 59 and contacts RE1 of relay RE. The opposite lead of relay coil RA is connected to power line 15. Relay coil RA is shunted by the series combination of resistor 57 and relay coil RF. A second relay coil RFM is connected to line 15 through lead 58 and is connected to line 14 through lead 60. Lead 60 contains contact RA3 of relay RA and contact RFA1 of relay RFA. A conductor 61 is connected to leads 60 between contacts RFA1 and RA3 and to lead 59 between contact RE1 and coil RA. A capacitor 62 is shunted across contacts RA3 and relay coil RFM.

As is shown in Figure 2, leads 33 and 28 for energizing the generator armature and series field are connected to generator shunt field 63, a resistor 64 being connected in parallel with this field. Lead 33 is also connected to a lead 65 containing contacts RU2 of "up" relay RU and RP1 of relay RP. Lead 65 is also connected to contacts RD2 of "down" relay RD and to series connected generator shunt field resistors 66, 67, 68, 69, 70, 71, and 72. These resistors are in turn connected to power line 15 through contacts RP2 of relay coil RP.

Resistor 67 is shunted by contact RG1 of relay RG, resistor 68 is shunted by contacts RH1 of relay RH and resistor 69 is shunted by contacts RI1 of relay RI. Contacts RG1, RH1, and RI1 are connected in series and joined to a lead 73. Lead 73 is in turn connected to contact RP2 and through that contact to power line 15. In a similar manner, resistor 72 is shunted by relay contacts RJ1 of relay RJ. A lead 74 containing normally closed contacts RM1 of relay coil RM is joined to lead 73 and to the juncture of resistors 70 and 71. In a similar manner, a lead 75 is connected between resistors 69 and 70. This lead contains normally closed contact RN1 of relay RN. A contact RU3 of up relay RU interconnects one lead of resistor 66 to lead 28.

In accordance with the present invention, a damping and plugging circuit indicated generally at 76 is connected across the generator shunt field for varying the excitation of the generator field to smooth out abrupt variations in the excitation when the elevator is accelerated and decelerated and to reverse the polarity of the generator shunt field when the elevator approaches a stop. More particularly, damping and plugging circuit 76 includes a damping motor 77. This damping motor is a direct current shunt motor having an armature 78 and a shunt field 80. The shaft of the damping motor drives an inertia fly wheel indicated diagrammatically at 81. Damping motor armature 78 is connected across the generator shunt field 63.

More particularly, one brush of damping motor armature 78 is connected to a lead 82 which is in turn joined to one terminal of variable resistance 83. The other terminal of this variable resistance is connected to lead 84. The variable resistance includes a movable tap 85 which is also joined to lead 84. Resistor 83 is shunted by contact ROA1 of relay ROA. Lead 84 is connected to line 33 through normally closed contact ROA2 of relay ROA. Line 84 also contains normally open contacts ROA3, and RBR1 of relay RBR. A conductor 86 is joined to line 84 between contacts ROA3 and RBR1. Conductor 86 contains normally closed contacts RBR2 of relay RBR and normally open contacts RF2 of relay RF. Conductor 86 is joined to a lead 87. Lead 87 is joined to a lead 88 through contacts RD3 of down relay RD, lead 88 in turn being connected to lead 65 between contacts RP1 and RU2.

Lead 87 is also connected to line 28 and is adapted to be joined to the opposite armature brush through the parallel combination of contacts RPA3, and series connected contacts RBR3 of relay RBR and normally closed contact ROA4. Contact ROA4 is connected to movable tap 90 associated with variable resistor 91. One terminal of this resistor is connected to tap 90, while the other terminal is connected through normally closed contact ROA7 to a brush of damping motor armature 78. The variable resistance 91 is shunted by normally closed contact RV1 of relay RV.

Line 33 is adapted to be connected to this same brush of the damping motor armature 78 through series connected contacts RF1, RBR4, ROA5, and lead 92. A lead 93 is shunted across damping motor armature 78 and variable resistance 94 from lead 92 to conductor 84. Lead 93 contains a resistor 94 and normally closed contact ROA6.

Another lead 95 is connected between lead 73 and lead 88. Lead 95 contains a variable resistor 96 connected in series with contacts RQ1 of relay RQ and contacts RR1 of relay RR. Another lead 97 is joined to lead 88 and is connected to lead 95 between contacts RQ1 and variable resistor 96. Lead 97 contains series connected contacts RQ2 and RR2. Lead 92 is joined to lead 97 through contacts RBR5.

One terminal of damping motor shunt field 80 is connected to lead 88 while the other terminal of the field is joined to a conductor 100 which contains variable resistor 101 and fixed resistance 102, resistance 102 being joined to line 73. The brake solenoid 103 is connected to power line 14 through normally open contact RE2 of relay coil RE. The other terminal of the brake solenoid is connected to lead 104 which is in turn joined to lead 73 through fixed resistance 105, resistance 106, and contact RE3 of relay RE. Resistance 106 is shunted by normally closed contact RC1 of relay RC.

The brake solenoid 103 is shunted by normally closed contacts RE4 of relay RE and resistors 107 and 108. A normally open contact RP3 of relay RP is connected across resistor 108. A lead 110 is connected to line 14 through contacts RE2. Three parallel leads 109, 111, and 112 are joined between lead 110 and lead 73. Two other parallel leads 113 and 114 are joined between lead 110 and lead 73 on the opposite side of contacts RWF1 placed in line 73 above leads 109, 111, and 112. A normally closed contact RN3 is placed in lead 110 between leads 113 and 114.

More particularly, lead 109 contains resistor 115 which are connected in series with relay coil RFA, relay coil RFA being shunted by variable resistance 116 and capacitor 117. Similarly, lead 111 contains contact RW2, resistor 118 and relay coil RS. Relay coil RS is shunted by variable resistance 120 and capacitor 121. Lead 112 contains brake indicator relay RBR. Lead 113 contains a relay coil RLA shunted by capacitor 122 and is in series with contact RN2 of leveling relay RN and resistor 123. Lead 114 is connected to a resistor 124 which is in series with relay coil RPA.

The elevator control system also includes conventional slow down limit switches. These switches are adapted to be operated when the elevator cab arrives at predetermined distances from the upper and lower limits of its travel. It will, of course, be appreciated that these limit switches can be placed in the hoistway if desired.

Figure 3:
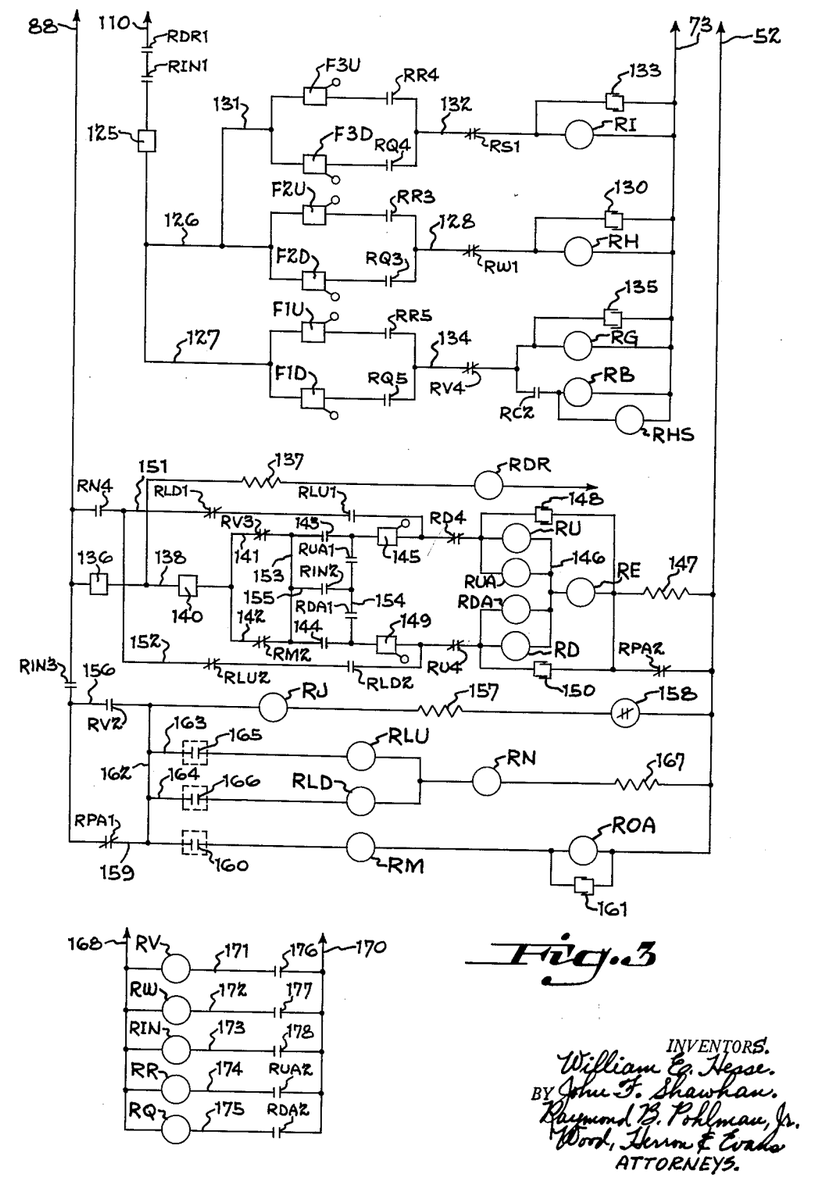

More particularly, the hoistway switches are connected across leads 110 and 73. As is best shown in Figure 3, lead 110 includes series connected contacts RDR1 of relay RDR and RIN1 of relay RIN. This lead also includes a buffer switch 125. Lead 110 is joined to a lead 126 and to lead 127. Lead 126 is joined to parallel connected second slow down limit switches F2U and F2D, F2U being a second slow down up switch and F2D being a second slow down down limit switch. Switches F2U and F2D are connected in parallel lines containing contacts RR3 and RQ3 respectively. Contacts RR3 and RQ3 are joined to a lead 128 containing normally closed contact RW1 of relay RW and relay coil RH, this latter coil being shunted by capacitor 130.

Lead 126 is also joined to a lead 131 which connects to two branch leads containing third slow down up limit switches F3U and third slow down down limit switches F3D. These switches are respectively connected in series with relay contacts RR4 and RQ4. These relay contacts are in turn joined to a lead 132 containing normally closed contact RS1 of relay RS. Lead 132 is also connected to relay coil RI which is in turn joined to line 73 which is in turn shunted by capacitor 133.

Lead 127 is similarly joined to two divided leads respectively containing first slow down up switches F1U and first slow down down limit switches F1D. These are first connected in series with contacts RR5 and RQ5 of relays RR and RQ respectively. The parallel branch lines containing these switches and contacts are joined to a lead 134 containing normally closed contact RV4 of relay RV. Lead 134 is also connected to parallel connected relay coils RG and RB, relay coil RB being connected to lead 134 through contacts RC2 of relay coil RC. Another relay coil RHS is connected in parallel with coil RB. A capacitor 135 is connected in parallel with relay coil RG.

As is further shown in Figure 3, the elevator control system includes a door relay RDR which is energized from lead 88 through a car door switch 136 and a resistor 137. Car door switch 136 is also connected to a lead 138 which contains hatch door switch 140. Lead 138 is connected to parallel leads 141 and 142. Lead 141 contains normally closed contact RV3 of relay RV and "up initiator" contact 143. This "up initiator" contact 143 and "down initiator" contact 144 in lead 142 are contacts of a conventional relay in the automatic call system (not shown). Lead 141 also contains up limit switch 145 and normally closed contact RD4 of down relay RD. Lead 141 is joined to parallel connected relay coils RU and RUA, these coils in turn being connected to a lead 146 which is joined to relay coil RE and is connected through that coil and resistor 147 to lead 52. Capacitor 148 is shunted across relay coils RU, RUA, and RE.

Lead 142 contains normally closed contact RM2 of relay RM, down initiator contact 144, and direction limit switch 149. This lead also contains contact RU4 of "up" relay RU, contact RU4 being joined to parallel connected relays RD and RDA. Second terminals of RD and RDA are joined to lead 146. A capacitor 150 is shunted across relay coils RD, RDA, and RE. Resistor 147 is shunted by a normally closed contact RPA2 of relay RPA. This portion of the control circuit also includes a conductor 151 which is joined to line 88 through contact RN4 of relay RN. Conductor 151 also includes normally closed contact RLD1 of relay RLD and normally open contact RLU1 of relay RLU. These latter contacts are joined to lead 141 between switch 145 and contacts RD4. Another lead 152 is joined to lead 151 and contains normally closed contacts RLU2 of relay RLU and normally open contacts RLD2 of relay RLD. Lead 152 is joined to lead 142 between switch 149 and contacts RU4. A lead 153 joins lead 141 and 142 between contacts RV3 and 143 in line 141 and contacts RM2 and 144 in line 142. A second parallel lead 154 is connected between leads 141 and 142 between contacts 143 and switch 145 in lead 141 and contacts 144 and switch 149 in lead 142. Lead 154 contains contact RUA1 of relay RUA and RDA1 of relay RDA. A conductor 155 is joined to lead 154 between these last named contacts and is connected to lead 153 through contact RIN2 of relay RIN.

Lead 88 is provided with contacts RIN3 and a lead 156 is connected below these contacts. Lead 156 includes contacts RV2 of relay RV, relay coil RJ, resistor 157, and zero speed switch 158. Lead 156 is returned to lead 52. A parallel lead 159 contains normally closed contacts RPA1 of relay RPA, magnetic low leveler contacts 160, relay coil RM, and relay coil ROA which is shunted by capacitor 161. Leads 156 and 159 are joined by a conductor 162. This conductor in turn is connected to two parallel leads 163 and 164. Lead 163 includes up leveling magnetic contact 165 and relay coil RLU. Lead 164 contains down level magnetic contacts 166 and relay coil RLD. The opposite leads of these relays are joined together and are connected to coil RN which is in turn connected to resistor 167. Up leveling magnetic contact 165 and down leveling magnetic contact 166 are contacts of conventional magnetic switches which cooperate with stationary vanes mounted in the hoistway. In a preferred embodiment contacts 165 close when a rising car is within eighteen inches of a floor and contacts 166 close when a descending car is within eighteen inches of a floor. These contacts remain closed until the car reaches floor level. Low leveler contacts 160 close when a car approaches within nine inches of the floor. It will readily be appreciated that contacts 160, 165 and 166 could be mechanical contacts operated in synchronism with the car movement if desired.

Five additional relays are shown at the bottom of Figure 3. These relays are adapted to be energized from lines 168 and 170, lines 168 and 170 being connected to a suitable source of power whenever the elevator is in operation. Five parallel leads 171, 172, 173, 174, and 175 extend between lines 168 and 170. The first of these leads contains coil RV and contacts 176. These contacts close when the car reaches the first slow down and remain closed until the doors open. Lead 172 contains relay coil RW and contact 177. Contact 177 closes when the car reaches the second slow down and remains closed until the doors open. As will be apparent to those skilled in the art, contacts 176 and 177 are operated in any conventional manner, preferably from a commutator type switch driven in synchronism with the car movement. These contacts are actuated at varying distances from the desired floor depending upon the particular installation. For a typical installation having a cab travel of five hundred feet per minute, contact 176 closes when the cab is ten feet six inches from the floor and contact 177 closes when the cab is five feet from floor level. Relay RS is a time delay relay which is energized approximately one and one half seconds after relay RW is closed. Lead 173 similarly includes coil RIN and contacts 178. These contacts open when the car is put on inspection. Lead 174 contains relay coil RR and contact RUA2 of relay coil RUA. Lead 175 contains relay coil RQ and contact RDA2 of relay coil RDA.

The main generator 12 is energized so that contacts 39 are closed and relay RP is energized. Assuming that the car receives an "up" signal, up initiator contacts 143 are closed energizing relays RU, RUA, and RE. When the RE relay coil is energized, its contacts RE2 and RE3, in series with the brake solenoid, close and its normally closed contact RE4 in series with resistances 107 and 108 shunting the brake solenoid coil, opens. The brake solenoid is thus energized and the brake released.

At the same time, the generator shunt field 63 is connected to power line 14 through contacts RP1 and RU2 and is connected to power line 15 through contacts RU3, resistor 66, and contacts RG1, RH1, RI1, RP2. As the generator potential builds up and the elevator motor accelerates, fixed resistance 66 remains in series with the generator shunt field. However, as is shown in Figure 2, the damping motor armature 78 is connected in parallel with the generator shunt field through line 33, contact ROA2, variable resistance 83, contact ROA7, normally closed contact RV1 and contacts RPA3.

When a voltage is applied to this parallel combination, the current will divide in an inverse proportion to the impedance of the components in parallel. Since initially the damping motor armature is at rest and no counter E.M.F. is present in the armature, the impedance of the armature is merely its D.C. impedance. Therefore, most of the current in this parallel network flows through the damping motor armature 78 and very little through the generator shunt field 63. However, since a voltage is applied across the damping motor armature 78, it begins to rotate; and as it rotates a counter E.M.F. is built up in the motor armature causing the apparent impedance of the armature to increase. As this impedance increases, more current will pass through the generator shunt field and less current through the damping motor armature. Since the output voltage of the main generator 11 is proportional to the shunt field current, the output voltage of the generator will increase smoothly. As is shown in Figure 1, the output voltage of the main generator armature is applied directly across the elevator motor armature and since the speed of the main drive elevator motor 10 is directly proportional to its armature voltage, the speed will increase in a smooth manner as the generator shunt field builds up. The rate of acceleration of the elevator motor is controlled by the adjustment of the shunt field of the damping motor and also by adjusting variable resistance 83 in series with damping motor armature 78. These adjustments directly control the impedance provided by the damping motor armature during the acceleration period.

The elevator motor builds up to maximum speed and continues at that speed until the cab approaches the desired floor. As indicated above, when the first slow down point is reached, by way of example at approximately ten feet from the floor, contact 176 closes energizing relay RV and deenergizing relay RG. This opens contact RG1 and inserts resistance 67 in series with the shunt field. As the elevator car continues to approach the floor, it reaches the second slow down point, at approximately five feet from the floor in the installation being described, and contact 177 closes energizing relay RW and deenergizing relay RH. This opens contact RH1 so that resistance 68 is connected in series with the generator shunt field. A short time after relay RW is closed, relay RS is closed deenergizing relay RI and opening contact RI1. This inserts resistance 69 in series with the generator shunt field.

It will readily be appreciated that when resistance 67, 68, and 69 are inserted in the generator shunt field circuit, the current in this field is reduced, the output of the main generator is reduced, and the elevator main drive motor 10 is decelerated. In the absence of damping motor 77, the insertion of these definite steps of resistance would result in jolts as the car is decelerated. However, the damping motor is effective to smooth out the changes in the excitation of the shunt field and thereby eliminate objectionable jolts of the elevator cab. More particularly, during the deceleration period, the generator shunt field remains connected to line 14 through closed contacts RP1, RU2 and line 33. This shunt field is also connected to line 15 through closed contact RU3, resistor 66, and one or more of the resistors 67, 68, and 69, depending upon the stage of the deceleration pattern. The damping motor armature 78 is still connected across the generator shunt field through contacts ROA2, variable resistance 83, contact ROA7, resistance 91, contact RPA3 and lead 87.

At the time that a resistance, such as resistance 67, is inserted in series with the generator shunt field, the damping motor is traveling at a speed faster than the speed dictated by the voltage then applied across its armature, which voltage is, of course, also reduced by the insertion of the resistance 67. During this deceleration period of the damping motor, the motor acts as a generator since the E.M.F. build up in the armature due to the speed of rotation of the armature under the influence of fly wheel 81, is higher than the voltage supplied to the armature. This counter E.M.F. produces a current flow in a reverse direction through the damping motor armature, the current flowing toward the generator field through resistor 83 and contact ROA2. Thus the current produced by the damping motor armature flows through generator shunt field 63 in the same direction as the primary flow due to the current flow in lines 14 and 15. This additional current supplied by the damping motor now acts as a generator smoothing out definite steps of the deceleration and causes the main generator voltage to die away at a rate controlled by the deceleration of the damping motor armature.

It will be noted that during the deceleration period, relay RV is energized opening contact RV1 and inserting resistance 91 in circuit with the damping motor armature. This resistance is effective to control the load that the damping motor works into and thereby exerts a control over the deceleration rate of the damping motor.

The elevator car continues its deceleration and when in the specific embodiment being described, it reaches a point nine inches from the floor, and the elevator car is running at its minimum speed, low leveler contacts 160 close, energizing relay RM, and after a brief time delay, relay ROA. When relay ROA is energized, its relay contacts ROA2 and ROA7 are opened, disconnecting the damping motor armature from the generator shunt field. The damping motor armature is then connected across lines 14 and 15; the armature being connected to line 14 through a circuit including contact RP1, lead 88, lead 95, contact RR1, contact RBR1, contact ROA3, contact ROA1, and to line 15 through line 92, contact ROA5, RBR5, line 97 through contact RR2, resistance 96, line 73 and contact RP2. It will be noted that the only impedance in the damping motor circuit is variable resistor 96. By setting this resistor, the rate of acceleration of the damping motor armature, its maximum speed and consequently its subsequent current output can be readily and accurately controlled.

When the car closely approaches the floor level, or reaches the dead zone, a small fraction of an inch from the floor level, levelling magnetic contacts 165 open, deenergizing relays RLU and RN. These relays in turn open the hold circuit to relays RU, RUA and RE. It will be noted that when relay RE opens, its contacts RE2 and RE3 open breaking a circuit to brake solenoid 103. However, this solenoid is shunted by normally closed contact RE4 of relay RE and resistors R7 and R8 in parallel with contact RP3. Thus, the inductance of the brake solenoid coil collapses slowly due to the current flow through these resistors and the solenoid is not deenergized for an appreciable length of time, whereby the application of the mechanical brake is delayed until after the car has been brought to a stop as described below. During this final stopping of the elevator car, the damping motor again functions as a generator which is reconnected in a reverse direction to the generator shunt field and functions to overcome the residual voltage of the generator and additionally to drive the voltage to the generator in the opposite direction to plug the main elevator motor 10 to a stop.

More particularly, as was indicated above, when relays RU and RE open, relay RBR is opened as well as relays RUA and RR. The opening of these relays disconnects the damping motor armature from lines 14 and 15. However, the damping motor continues to rotate due to the energy previously stored in damping motor fly wheel 81, and the damping motor thus acts as a generator.

The damping motor is again connected by the actuation of these relays to generator shunt field 63. More particularly, the left hand, or positive side, of the damping motor armature is connected through lead 82, contact ROA1, lead 84, contact ROA3, lead 86, contacts RBR2, and RF2, lead 87, and lead 28 to the right hand side of the generator shunt field. In previous operation, the left hand, or positive side, of the damping motor armature was always connected to the left hand side of the generator field. In a similar manner, the right or negative side of the armature 78 is connected through lead 92, contact ROA5, contact RBR4, contact RF1, and lead 33 to the left hand side of generator shunt field 63. The output voltage of the damping motor armature is thus applied in a reverse direction to the shunt field so that the residual voltage of the generator is overcome and the output voltage is reversed, whereby the main elevator motor is plugged to a complete stop before the mechanical brake is applied.

From the above disclosure of the general principles of the present invention and the above description of the construction and operation of a specific embodiment, those skilled in the art will readily comprehend various modifications to which the present system is susceptible. Therefore, we desire to be limited only by the scope of the following claims.

Having described our invention, we claim:

1. A system for controlling the operation of an electric elevator and the like comprising a motor for raising and lowering the elevator car, a supply generator in electrical circuit connection with said motor, said supply generator having a field winding, means including a resistance in circuit with said winding, and a switching device for varying said resistance for varying the excitation of said generator and speed of said motor, and means for decreasing the rate of change of excitation of said generator below the value determined solely by the winding inductance of said generator, said last named means including a damping motor having its armature in electrical circuit connection with said generator field winding, said damping motor having a kinetic energy storing device associated therewith, elevator car position responsive means for disconnecting said damping motor from said field winding when the elevator car is a predetermined distance from a floor at which the car is to be stopped, and means for reconnecting said damping motor armature to said winding in a reverse relationship when the car is at a lesser predetermined distance from the floor, whereby the damping motor applies a reverse potential to said field winding.

2. A system for controlling the operation of an electric elevator and the like comprising a direct current motor for raising and lowering the elevator car, a direct current supply generator in electrical circuit connection with said motor, said supply generator having a shunt field winding, means including a resistance in circuit with said winding, and a switching device for varying said resistance for varying the excitation of said generator and speed of said motor, means for decreasing the rate of change of excitation of said generator below the value determined solely by the winding inductance of said generator, said last named means including a direct current shunt wound damping motor having its armature in electrical circuit connection with said generator shunt field winding, said damping motor having a kinetic energy storing device associated threwith, elevator car position responsive means for disconnecting said damping motor from said shunt field winding when the elevator car is a predetermined distance from a floor at which the car is to be stopped, and means for reconnecting said damping motor armature to said shunt winding in a reverse relationship when the car is at a lesser predetermined distance from the floor, whereby the damping motor functions as a generator and applies a reverse potential to said field winding.

3. A system for controlling the operation of an electric elevator and the like comprising a direct current motor for raising and lowering the elevator car, a direct current supply generator in electrical circuit connection with said motor, said supply generator having a shunt field winding, means including a resistance in circuit with said winding, and a switching device for varying said resistance for varying the excitation of said generator and speed of said motor, means for decreasing the rate of change of excitation of said generator below the value determined solely by the winding inductance of said generator, said last named means including a direct current shunt wound damping motor having its armature in electrical circuit connection with said generator shunt field winding, said damping motor having a kinetic energy storing device associated therewith, elevator car position responsive means for disconnecting said damping motor from said shunt field winding when the elevator car is a predetermined distance from a floor at which the car is to be stopped, means for reconnecting said damping motor armature to said shunt winding in a reverse relationship when the car is at a lesser predetermined distance from the floor, whereby the damping motor functions as a generator and applies a reverse potential to said field winding, and means for adjustably controlling the speed of said damping motor.

4. A system for controlling the operation of an electric elevator and the like comprising a motor for raising and lowering the car, a supply generator in electrical circuit connection with said motor, said supply generator having a field winding, means including a resistance in circuit with said winding, and a switching device for varying said resistance for varying the excitation of said generator and speed of said motor, means for decreasing the rate of change of excitation of said generator below the value determined solely by the winding inductance of said generator, said last named means including a damping motor having its armature in electrical circuit connection with said generator field winding, said damping motor having a kinetic energy storing device associated therewith, elevator car position responsive means for disconnecting said damping motor from said field winding when the elevator car is a predetermined distance from a floor at which the car is to be stopped, and means for reconnecting said damping motor armature to said winding in a reverse relationship when the car is at a lesser predetermined distance from the floor whereby the damping motor applies a reverse potential to said field winding, and an electrically responsive brake in mechanical connection with said elevator motor, and means for delaying actuation of said brake for a sufficient time after said damping motor is reconnected to said generator field to allow said generator field to reverse and plug said elevator motor to a stop.

5. A system for controlling the operation of an electric elevator and the like comprising a motor for raising and lowering the car, a supply generator in electrical circuit connection with said motor, said supply generator having a field winding, means including a resistance in circuit with said winding, and a switching device for varying said resistance for varying the excitation of said generator and speed of said motor, means for decreasing the rate of change of excitation of said generator below the value determined solely by the winding inductance of said generator, said last named means including a damping motor having its armature in electrical circuit connection with said generator field winding, said damping motor having a kinetic energy storing device associated therewith, elevator car position responsive means for disconnecting said damping motor from said field winding when the elevator car is a predetermined distance from a floor at which the car is to be stopped, means for accelerating said damping motor after said damping motor has been disconnected from said field winding, and means for reconnecting said damping motor armature to said winding in a reverse relationship when the car is at a lesser predetermined distance from the floor, whereby the damping motor applies a reverse potential to said field winding.

6. A system for controlling the operation of an electric elevator and the like comprising a motor for raising and lowering the car, a supply generator in electrical circuit connection with said motor, said supply generator having a field winding, means including a resistance in circuit with said winding, a switching device for varying sad resistance for varying the excitation of said generator and speed of said motor, and means for decreasing the rate of change of excitation of said generator below the value determined solely by the winding inductance of said generator, said last named means including a damping motor having its armature in electrical circuit connection with said generator field winding, said damping motor having a kinetic energy storing device associated therewith, elevator car position responsive means for disconnecting said damping motor from said field winding when the elevator car is a predetermined distance from a floor at which the car is to be stopped, means for accelerating said damping motor after it has been disconnected from said field winding and means for controlling said acceleration, said last named means comprising a variable resistance in circuit connection with said damping motor, and means for reconnecting said damping motor armature to said winding in a reverse relationship when the car is at a lesser predetermined distance from the floors whereby the damping motor applies a reverse potential to said field winding.

7. A system for controlling the operation of an electric elevator and the like comprising a direct current motor for raising and lowering the car, a direct current supply generator in electrical circuit connection with said motor, said supply generator having a shunt field winding, means including a resistance in circuit with said winding, a switching device for varying said resistance for varying the excitation of said generator and speed of said motor, and means for decreasing the rate of change of excitation of said generator below the value determined solely by the winding inductance of said generator, said last named means including a direct current shunt wound damping motor having its armature in electrical circuit connection with said generator shunt field winding, said damping motor having a kinetic energy storing device associated therewith, elevator car position responsive means for disconnecting said damping motor from said field winding when the elevator car is a predetermined distance from a floor at which the car is to be stopped, means for accelerating said damping motor after it has been disconnected from said field winding, and means for controlling said acceleration, said last named means comprising a variable resistance in circuit connection with said damping motor, and means for reconnecting said damping motor armature to said shunt winding in a reverse relationship when the car is at a lesser predetermined distance from the floors whereby the damping motor applies a reverse potential to said field winding.

8. A system for controlling the operation of an electric elevator and the like comprising a motor for raising and lowering the car, a supply generator in electrical circuit connection with said motor, said supply generator having a shunt field winding, means including a resistance in circuit with said winding, and a switching device for varying said resistance for varying the excitation of said generator and speed of said motor, and means for decreasing the rate of change of excitation of said generator below the value determined solely by the winding induc- tance of said generator, said last named means including a damping motor having its armature in electrical circuit connection with said generator field winding, said damping motor having a kinetic energy storing device associated therewith, elevator car position responsive means for disconnecting said damping motor and said resistance from said generator winding when the elevator car is a predetermined distance from a floor at which the car is to be stopped, and means for reconnecting said damping motor armature directly across said shunt winding in a reverse relationship when the car is at a lesser predetermined distance from the floor, whereby the damping motor functions as a generator and applies a reverse potential to said field winding.

9. A motor control system comprising a main driving motor, a supply generator therefor provided with a field winding, means for varying the excitation of said generator to vary the speed of said motor, and means for controlling the rate of variation of excitation of said generator and the rate of speed of said motor and for electrically stopping said motor, said last named means comprising an auxiliary damping motor connected to said winding, said auxiliary damping motor having an inertia fly wheel associated therewith for storing kinetic energy, first electrically responsive means for removing the armature of said damping motor from circuit connection with said generator field winding, and second electrically responsive means for reversing the connections of said damping motor and said field winding and placing said armature and winding in circuit connection, whereby said damping motor functions as a generator and is effective to change the polarity of said winding.

10. A motor control system comprising a main driving motor, a supply generator therefor provided with a field winding, means for varying the excitation of said generator to vary the speed of said motor, means for controlling the rate of variation of excitation of said generator and the rate of speed of said motor and for dynamically braking said motor, said last named means comprising an auxiliary damping motor connected to said winding, said auxiliary damping motor having an armature, an inertia fly wheel associated therewith for storing kinetic energy, first electrically responsive means for removing the armature of said damping motor from circuit connection with said generator, second electrically responsive means for energizing the armature of said damping motor to accelerate said damping motor, and third electrically responsive means for reversing the connections of said damping motor and said field winding and placing said armature and winding in circuit connection, whereby said damping motor functions as a generator and is effective to change the polarity of said field winding and dynamically brake said main driving motor.

11. A motor control system comprising a main driving motor, a supply generator therefor provided with a field winding, means for varying the excitation of said generator to vary the speed of said motor, means for controlling the rate of variation of excitation of said generator and the rate of speed of said motor and for dynamically braking said motor, said last named means comprising an auxiliary damping motor connected to said winding, said auxiliary damping motor having an armature, an inertia fly wheel associated therewith for storing kinetic energy, first electrically responsive means for removing the armature of said damping motor from circuit connection with said generator, second electrically responsive means for energizing the armature of said damping motor to accelerate said damping motor, and third electrically responsive means for reversing the connections of said damping motor and said field winding and placing said armature and winding in circuit connection, whereby said damping motor functions as a generator and is effective to change the polarity of said field winding and dynamically brake said main driving motor, and means for controlling the acceleration of said damping motor.

12. A motor control system comprising a main driving motor, a supply generator therefor provided with a field winding, means for varying the excitation of said generator to vary the speed of said motor, means for controlling the rate of variation of excitation of said generator and the rate of speed of said motor and for dynamically braking said motor, said last named means comprising an auxiliary damping motor connected to said winding, said auxiliary damping motor having an armature, an inertia fly wheel associated therewith for storing kinetic energy, first electrically responsive means for removing the armature of said damping motor from circuit connection with said generator, second electrically responsive means for energizing the armature of said damping motor to accelerate said damping motor, and third electrically responsive means for reversing the connections of said damping motor and said field winding and placing said armature and winding in circuit connection, whereby, said damping motor functions as a generator and is effective to change the polarity of said field winding and dynamically brake said main driving motor, said last named means comprising a variable resistance in circuit connection with said damping motor armature.

13. A motor control system comprising a main driving motor, a supply generator therefor provided with a shunt field winding, means for varying the excitation of said generator to vary the speed of said motor, means for controlling the rate of variation of excitation of said generator and the rate of speed of said motor and for dynamically braking said motor, said last named means comprising an auxiliary damping motor connected to said winding, said auxiliary damping motor having an armature and an inertia fly wheel associated therewith for storing kinetic energy, first electrically responsive means for removing the armature of said damping motor from circuit connection with said generator, second electrically responsive means for energizing said damping motor armature, and third electrically responsive means for reversing the connections of said damping motor armature and said field winding and placing said armature and winding in circuit connection, whereby said damping motor functions as a generator and is effective to change the polarity of said winding.

14. In a motor control system of the type having a main driving motor, a supply generator therefor provided with a field winding, and means for varying the excitation of said generator to vary the speed of said motor, the novel combination of means for controlling the rate of variation of excitation of said generator and the rate of speed of said motor and for dynamically braking said motor, said last named means comprising an auxiliary damping motor connected to said field winding, said auxiliary damping motor having an armature and an inertia fly wheel associated therewith for storing kinetic energy, first electrically responsive means for removing the armature of said damping motor from circuit connection with said generator, and second electrically responsive means fo rreversing the connections of said damping motor and said winding and placing said armature and winding in circuit connection whereby said damping motor functions as a generator and is effective to change the polarity of said winding.

15. In a motor control system of the type having a main driving motor, a supply generator therefor provided with a field winding, and means for varying the excitation of said generator to vary the speed of said motor, the novel combination of means for controlling the rate of variation of excitation of said generator and the rate of speed of said motor and for dynamically braking said motor, said last named means comprising an auxiliary damping motor connected to said field winding, said auxiliary damping motor having an armature and an inertia fly wheel associated therewith for storing kinetic energy, first electrically responsive means for removing the armature of said damping motor armature from circuit connection with said generator, second electrically responsive means for energizing said damping motor armature to accelerate said damping motor armature after said armature has been disconnected from said generator field winding, and third electrically responsive means for reversing the connections of said damping motor and said winding and placing said armature and winding in circuit connection whereby said damping motor functions as a generator and is effective to change the polarity of said winding.

16. In a motor control system of the type having a main driving motor, a supply generator therefor provided with a field winding, and means for varying the excitation of said generator to vary the speed of said motor, the novel combination of means for controlling the rate of variation of excitation of said generator and the rate of speed of said motor and for dynamically braking said motor, said last named means comprising an auxpiliary damping motor connected to said field winding, said auxiliary dampin gmotor having an armature and an inertia fly wheel associated therewith for storing kinetic enegry, first electrically responsive means for removing the armature of said damping motor armature from circuit connection with said generator, second electrically responsive means for energizing said damping motor armature to accelerate said damping motor armature after said armature has been disconnected from said generator field winding, a variable resistance in circuit connection with said damping armature, and third electrically responsive means for reversing the connections of said damping motor and said winding and placing said armature and winding in circuit connection whereby said damping motor functions as a generator and is effective to change the polarity of said winding.

References Cited in the file of this patent

UNITED STATES PATENTS

| | | |
|---|---|---|
| 2,586,412 | Winchester | Feb. 19, 1952 |
| 2,741,731 | Pestarini | Apr. 10, 1956 |